United States Patent [19]

Bosse

[11] 4,161,559
[45] Jul. 17, 1979

[54] REINFORCED WEBS OF FILM

[75] Inventor: Frank Bosse, Tecklenburg, Fed. Rep. of Germany

[73] Assignee: Windmoller & Holscher, Lengerich, Fed. Rep. of Germany

[21] Appl. No.: 874,156

[22] Filed: Feb. 1, 1978

[30] Foreign Application Priority Data

Feb. 22, 1977 [DE] Fed. Rep. of Germany ....... 2707584

[51] Int. Cl.² .............................................. B32B 5/12
[52] U.S. Cl. ...................................... 428/110; 428/36; 428/189; 428/192; 428/294
[58] Field of Search ................. 428/36, 192, 294, 295, 428/121, 124, 125, 126, 247, 110, 157, 189

[56] References Cited

U.S. PATENT DOCUMENTS

| 3,123,279 | 3/1964 | Day | 229/53 |
|---|---|---|---|
| 3,314,841 | 4/1967 | Romanen | 428/294 |
| 3,332,831 | 7/1967 | Stoller | 428/162 |
| 3,598,166 | 8/1971 | Wells | 428/295 |
| 3,720,569 | 3/1973 | Kimble | 428/295 |
| 3,720,570 | 3/1973 | Greene et al. | 428/126 |
| 3,729,365 | 4/1973 | Greene | 428/126 |
| 3,791,911 | 2/1974 | Yaeger et al. | 428/294 |
| 3,959,544 | 5/1976 | Rogers | 428/294 |
| 4,002,789 | 1/1977 | Klein | 428/294 |
| 4,041,202 | 8/1977 | Williams | 428/294 |

FOREIGN PATENT DOCUMENTS 2514105 7/1976 Fed. Rep. of Germany.

*Primary Examiner*—James J. Bell
*Attorney, Agent, or Firm*—Fleit & Jacobson

[57] ABSTRACT

A composite web comprises a film of plastics or other material laminated to a reinforcing layer formed by a network of tapes which extend in zigzag fashion back and forth across the laminating film with their points of reversal within the confines of the film edges so as to be covered by the film. If there are two equally wide laminating films, one on each face of the reinforcing tape layer, the films may be offset to overlap one another laterally and the width of the tape layer exceeds that of each film by the amount of overlap, whereby the points of reversal of the tapes are covered by one of the films along one longitudinal edge of the web and by the other film along the other longitudinal edge of the web.

2 Claims, 4 Drawing Figures

REINFORCED WEBS OF FILM

The invention relates to a layer-reinforced web of film consisting of at least one web of film on which a layer of intersecting tapes in zigzag formation is secured to extend over the width of the layer.

In a layer-reinforced web of film of this kind known from DT-OS No. 25 14 105, intersecting tapes are welded to lie between two covering films. The known layer-reinforced web of film is produced in that a laterally reciprocating comb lays a series of tapes in zigzag formation between two equally wide travelling webs of film, the tapes being held at their points of reversal by pitch chains at the right and left-hand sides beyond the confines of the webs of film. The two covering films are subsequently compressed together with the intersecting tensioned tapes, the so-called layer, and, after release from the pitch chains, are united by means of heated laminating rollers. Since the points of reversal of the layer are still suspended from the retaining prongs of the pitch chains whilst the layer is laminated to the webs of film that line same on both sides, the regions of reversal of the layer formed by the tapes in the known layer-reinforced web of film are not lined by the covering films.

The known layer-reinforced web of film has a high strength, particularly against further tearing, and would therefore be very suitable for the manufacture of large high-duty sacks.

However, if one processes the known layer-reinforced films to form large sacks, the regions of reversal of the tape layer exposed inside and outside the sack would become so troublesome that the sack is practically useless. This is because within the sack small particles can become tangled with the exposed strips of the layer, thereby making it difficult to empty the sack. The strips of the layer exposed on the outside of the sack are particularly disadvantageous because objects can tangle therewith during filling, conveying, stacking and other handling. The looped regions of reversal of the tapes forming the exposed strips of the layer can easily remain attached to obstacles, which would damage the sack and cause it to leak.

The disadvantage resulting from the exposed strips of the layer cannot be avoided by severing same from the layer-reinforced web of film with trimming shears. When the weld seams forming the sack are stressed, the individual tapes of the layer would then become pulled out of the weld seam to form considerable points of weakness at the highly stressed positions of the seam and present the danger of the filled sack bursting.

It is therefore the problem of the present invention to provide a layer-reinforced web of film that meets the requirements placed on a web of film for the manufacture of large high-duty sacks in a satisfactory manner.

According to the invention, this problem is solved in a layer-reinforced web of film of the aforementioned kind in that the reversal points of the tapes are covered by the web of film on at least one side of the film. The web of film according to the invention permits the manufacture of sacks in which the reversal regions of the tapes forming the layer are covered in the interior as well as on the outside of the sack by the laminating film. Further, adequately strong weld seams can be produced in that the seam is passed through the region of overlap of the tape layer which is bounded on both sides by the reversal points which are disposed on a line. The weld seam or other connecting seam is given its required strength in that the loops formed by the regions of reversal are almost hooked to the seam.

In the case of a tape layer laminated with film on both sides, it is advantageous for the two webs of film to be superposed in a laterally offset arrangement and the tape layer to be covered on both sides by only one web by the extent of the offset. If, when forming a tube to produce a sack, the regions of the tape layer that are not covered by a film are superposed and interconnected, then in the finished sack the tape layer is covered by films in the interior of the sack as well as on the outside. When forming the weld seam, offsetting the webs and the layer brings the additional advantage that fewer layers have to be welded through without detrimentally influencing the durability and strength of the seam.

To produce the film according to the invention, the reversal points of the series of tapes pulled out by a rake or comb can, immediately the latter drops off, be secured on an adhesive-coated film with the aid of a pressure belt. If, after the reversal points have dropped off the rake and until they are pressed on and secured to the adhesive-coated film, the reversal points become displaced, this is not detrimental because the resulting rounding-off of the reversal points has a tendency to increase the strength of the layer-reinforced web of film.

An example of the invention will now be described in more detail with reference to the drawing, in which.

Figure 2:
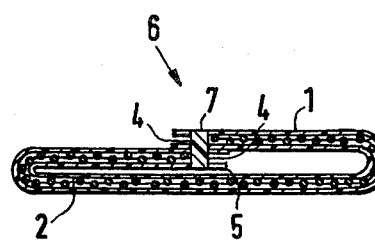
FIG. 2 is a cross-section of a tubular film formed from the web of film of FIG. 1.
Figure 1:
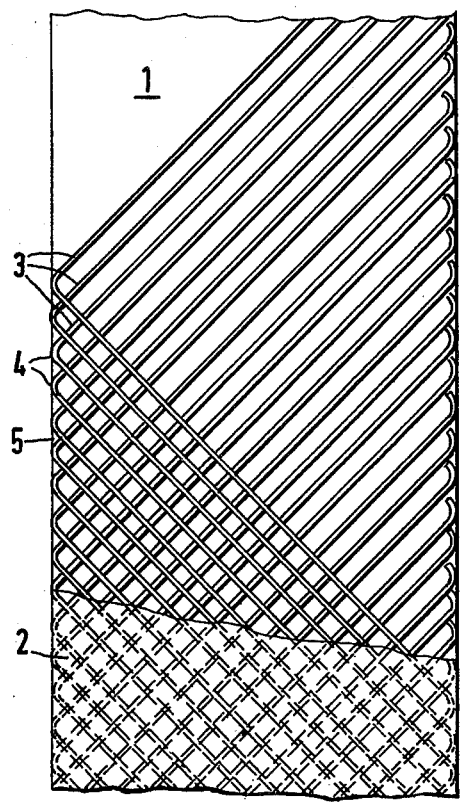
FIG. 1 is a plan view of a layer-reinforced web of film.

The layer-reinforced web of film shown in FIG. 1 consists of two webs 1 and 2 of film enclosing a layer 3 of intersecting tapes. The reversal points 4 of the layer 3 are disposed within the lateral bounding edges 5 of the webs 1 and 2 of film. If a tube 6 (FIG. 2) is formed from such a flat web and provided with a longitudinal seam, then the reversal points 4 of the layer 3 are disposed within the weld seam 7 or project slightly therefrom so that, even when the seam is stressed, the individual tapes cannot be pulled out of the seam 7 because they are retained by the loop formed in the reversal region.

Figure 4:
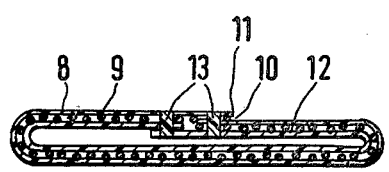
FIG. 4 is a cross-section of a tubular film formed from the FIG. 3 web of film.
Figure 3:
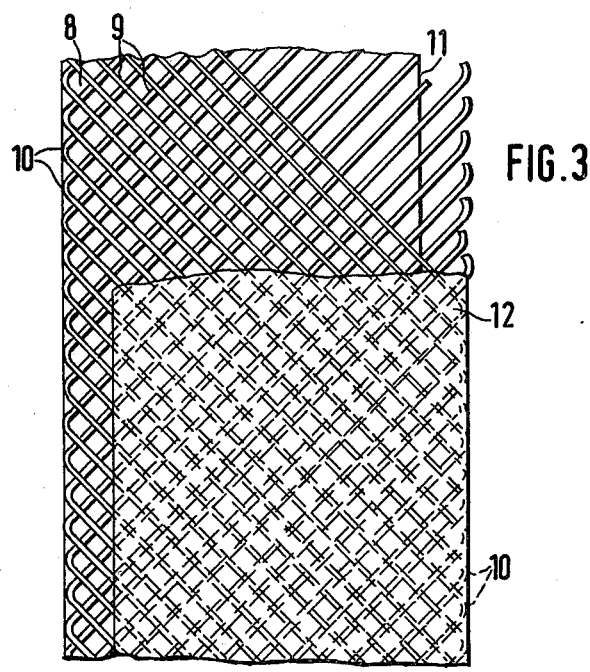
FIG. 3 shows a layer-reinforced web of film with covering films that are offset from one another.

In the web 8 of film illustrated in FIG. 3, the tape layer 9 is wider than the web 8 of film itself so that the reversal points 10 at one side of the layer 9 project beyond the edge 11 of the web 8 of film. Placed on the layer 9 there is a second web 12 of film which is offset relatively to the web 8 of film to an extent such that the projecting parts of the tape layer 9 are covered at the top. If, now, one forms a tube (FIG. 4) from such a reinforced web of film, the layer will be covered on the inside as well as on the outside by a web of film. The advantage of such a tube relatively to the FIG. 2 tube resides in the fact that the films 8 or 12 can be welded directly to one another in the region of overlap so as to enclose the layer 9 between each other. The welding heat need therefore not be as high for the seams 13 as in the case of the tube according to FIG. 2. Of course it is also possible to form the longitudinal seams by inserting an extruded hot-melt strip or the like instead of using a weld seam.

What is claimed is:

1. In a layer-reinforced web of film of the type having a layer of intersecting tapes positioned between two webs of film, the improvement wherein the layer of intersecting tapes has longitudinal edges defined by points of inversion of the tapes and wherein the webs are superimposed with the longitudinal axes of the webs axially off-set from each other so that the longitudinal edges of the layer of intersecting tapes are covered by only one of the two webs of film.

2. The improvement of claim 1 wherein the width of the layer of intersecting tapes is greater than the width of the webs of film.